(12) United States Patent
Chun et al.

(10) Patent No.: US 8,594,030 B2
(45) Date of Patent: Nov. 26, 2013

(54) METHOD FOR CONTROLLING HARQ OPERATION IN DYNAMIC RADIO RESOURCE ALLOCATION

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 12/672,999

(22) PCT Filed: Aug. 8, 2008

(86) PCT No.: PCT/KR2008/004641
§ 371 (c)(1),
(2), (4) Date: Feb. 10, 2010

(87) PCT Pub. No.: WO2009/022826
PCT Pub. Date: Feb. 19, 2009

(65) Prior Publication Data
US 2011/0182247 A1    Jul. 28, 2011

Related U.S. Application Data

(60) Provisional application No. 60/955,040, filed on Aug. 10, 2007, provisional application No. 60/982,145, filed on Oct. 24, 2007, provisional application No. 60/982,710, filed on Oct. 25, 2007, provisional application No. 60/983,304, filed on Oct. 29, 2007.

(30) Foreign Application Priority Data

Aug. 8, 2008    (KR) .................. 10-2008-0077778

(51) Int. Cl.
*G01R 31/08*    (2006.01)
*G06F 11/00*    (2006.01)
*G08C 15/00*    (2006.01)
*H04J 1/16*    (2006.01)
*H04J 3/14*    (2006.01)
*H04W 4/00*    (2009.01)
*H04L 1/00*    (2006.01)
*H04L 12/26*    (2006.01)

(52) U.S. Cl.
USPC ........ 370/329; 370/230; 370/230.1; 370/231; 370/235; 370/328

(58) Field of Classification Search
None
See application file for complete search history.

(56) References Cited

U.S. PATENT DOCUMENTS 6,445,917 B1    9/2002  Bark et al.
(Continued)

FOREIGN PATENT DOCUMENTS

CN    1314747    9/2001
(Continued)

OTHER PUBLICATIONS

LG Electronics Inc. "Correction of status report coding", 3GPP TSG RAN WG2 #61, Feb. 11-15, 2008, Sorrento, Italy, XP-002624626, R2-080969.

(Continued)

*Primary Examiner* — Faruk Hamza
*Assistant Examiner* — Diane Lo
(74) *Attorney, Agent, or Firm* — McKenna Long & Aldridge LLP (57) ABSTRACT

A wireless communication system providing wireless communication services and a terminal are provided. There is also provided a method for communicating data between a base station and a terminal in Evolved Universal Mobile Telecommunications System (E-UMTS) or Long Term Evolution (LTE) System evolved from UMTS, particularly, a method for transferring maximum data with minimum radio resources by controlling a Hybrid Automatic Repeat request (HARQ) operation in a dynamic radio resource allocation or scheduling.

4 Claims, 4 Drawing Sheets

(56) References Cited

U.S. PATENT DOCUMENTS

| | | |
|---|---|---|
| 6,594,240 B1 | 7/2003 | Chuah et al. |
| 6,594,244 B1 | 7/2003 | Chang et al. |
| 6,628,946 B1 | 9/2003 | Wiberg et al. |
| 6,728,918 B1 | 4/2004 | Ikeda |
| 6,788,944 B2 | 9/2004 | Jiang |
| 6,862,450 B2 | 3/2005 | Mikola et al. |
| 7,171,163 B2 | 1/2007 | Terry et al. |
| 7,227,868 B2 | 6/2007 | Inden |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 8,270,348 B2 | 9/2012 | Chun et al. |
| 2002/0001314 A1 | 1/2002 | Yi et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0099305 A1 | 5/2003 | Yi et al. |
| 2004/0008659 A1 | 1/2004 | Kim |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0208160 A1 | 10/2004 | Petrovic et al. |
| 2004/0223507 A1 | 11/2004 | Kuchibhotla et al. |
| 2004/0229626 A1 | 11/2004 | Yi et al. |
| 2005/0019309 A1 | 1/2005 | Park et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0083943 A1 | 4/2005 | Lee et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1 | 10/2005 | Yi et al. |
| 2005/0249141 A1 | 11/2005 | Lee et al. |
| 2005/0254467 A1 | 11/2005 | Li et al. |
| 2005/0259662 A1 | 11/2005 | Kim |
| 2005/0286483 A1 | 12/2005 | Lee et al. |
| 2006/0007886 A1 | 1/2006 | Lee et al. |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067364 A1 | 3/2006 | Jung et al. |
| 2006/0072503 A1 | 4/2006 | Kim et al. |
| 2006/0092972 A1* | 5/2006 | Petrovic et al. ............ 370/469 |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield |
| 2006/0251027 A1 | 11/2006 | Chun |
| 2006/0251105 A1 | 11/2006 | Kim et al. |
| 2006/0264179 A1 | 11/2006 | Bonneville et al. |
| 2006/0274690 A1 | 12/2006 | Chun et al. |
| 2006/0280145 A1 | 12/2006 | Revel |
| 2006/0281456 A1 | 12/2006 | Roberts et al. |
| 2007/0041397 A1 | 2/2007 | Hwang |
| 2007/0047452 A1 | 3/2007 | Lohr et al. |
| 2007/0047493 A1 | 3/2007 | Park et al. |
| 2007/0053309 A1 | 3/2007 | Poojary et al. |
| 2007/0079207 A1 | 4/2007 | Seidel et al. |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0177628 A1 | 8/2007 | Choi et al. |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 | 8/2007 | Zhang |
| 2007/0206530 A1 | 9/2007 | Lee et al. |
| 2007/0223526 A1 | 9/2007 | Jiang |
| 2007/0258591 A1 | 11/2007 | Terry et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0002688 A1* | 1/2008 | Kim et al. ............ 370/389 |
| 2008/0008152 A1 | 1/2008 | Lohr et al. |
| 2008/0043658 A1 | 2/2008 | Worall |
| 2008/0043670 A1 | 2/2008 | Marinier |
| 2008/0045224 A1 | 2/2008 | Lu et al. |
| 2008/0045272 A1* | 2/2008 | Wang et al. ............ 455/561 |
| 2008/0049682 A1 | 2/2008 | Ding et al. |
| 2008/0051098 A1 | 2/2008 | Rao |
| 2008/0059859 A1* | 3/2008 | Marinier et al. ............ 714/748 |
| 2008/0069108 A1 | 3/2008 | Yi et al. |
| 2008/0081598 A1 | 4/2008 | Chandra et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1 | 9/2008 | Jiang |
| 2008/0232396 A1 | 9/2008 | Buckley et al. |
| 2008/0233940 A1 | 9/2008 | Jen |
| 2008/0233941 A1 | 9/2008 | Jen |
| 2008/0261581 A1 | 10/2008 | Cai |
| 2008/0268878 A1 | 10/2008 | Wang et al. |
| 2008/0273482 A1 | 11/2008 | Lee et al. |
| 2008/0273610 A1 | 11/2008 | Malladi et al. |
| 2008/0310395 A1 | 12/2008 | Kashima |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1 | 2/2009 | Parkvall et al. |
| 2009/0046631 A1 | 2/2009 | Meylan et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0119564 A1 | 5/2009 | Sagfors et al. |

| | | | |
|---|---|---|---|
| 2009/0156194 A1 | 6/2009 | Meylan | |
| 2009/0175163 A1 | 7/2009 | Sammour et al. | |
| 2009/0175253 A1 | 7/2009 | Wu et al. | |
| 2009/0190480 A1 | 7/2009 | Sammour et al. | |
| 2009/0232076 A1 | 9/2009 | Kuo | |
| 2009/0259908 A1 | 10/2009 | Gollapudi | |
| 2009/0305712 A1 | 12/2009 | Franceschini et al. | |
| 2010/0014466 A1 | 1/2010 | Meyer et al. | |
| 2010/0091750 A1 | 4/2010 | Lee et al. | |
| 2010/0128648 A1 | 5/2010 | Lee et al. | |
| 2010/0142429 A1 | 6/2010 | Yi et al. | |
| 2010/0157904 A1 | 6/2010 | Ho et al. | |
| 2010/0232335 A1 | 9/2010 | Lee et al. | |
| 2010/0260140 A1 | 10/2010 | Zhu | |
| 2011/0019604 A1 | 1/2011 | Chun et al. | |
| 2011/0033048 A1 | 2/2011 | Stanwood et al. | |
| 2011/0149865 A1 | 6/2011 | Lee et al. | |

FOREIGN PATENT DOCUMENTS

| | | |
|---|---|---|
| CN | 1339903 | 3/2002 |
| CN | 1349360 | 5/2002 |
| CN | 1396780 | 2/2003 |
| CN | 1549610 | 11/2004 |
| CN | 1613210 A | 5/2005 |
| CN | 1642067 | 7/2005 |
| CN | 1643820 A | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 101047966 | 10/2007 |
| CN | 101090281 | 12/2007 |
| EP | 1 263 160 A1 | 12/2002 |
| EP | 1326397 | 7/2003 |
| EP | 1 509 011 A2 | 2/2005 |
| EP | 1 638 237 A2 | 3/2006 |
| EP | 1695462 A1 | 8/2006 |
| EP | 1746855 A2 | 1/2007 |
| EP | 1768297 | 3/2007 |
| EP | 2026523 | 2/2009 |
| EP | 2 163 006 | 3/2009 |
| EP | 2108223 | 10/2009 |
| JP | 6-053921 | 2/1994 |
| JP | 07-162948 | 6/1995 |
| JP | 2000-324161 | 11/2000 |
| JP | 2001-197021 | 7/2001 |
| JP | 2002-198895 | 7/2002 |
| JP | 2003-018050 | 1/2003 |
| JP | 2003-115796 | 4/2003 |
| JP | 2003-115876 | 4/2003 |
| JP | 2003-516021 | 5/2003 |
| JP | 2003-229925 A | 8/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006-505209 A | 2/2006 |
| JP | 2006-51466 | 4/2006 |
| JP | 2006-121562 | 5/2006 |
| JP | 2006-311543 A | 11/2006 |
| JP | 2007-116639 | 5/2007 |
| JP | 2007-312244 | 11/2007 |
| JP | 2008-520125 | 6/2008 |
| JP | 2009-513058 A | 3/2009 |
| JP | 2009-521893 A | 6/2009 |
| JP | 2010518683 | 5/2010 |
| KR | 10-2001-0045783 | 6/2001 |
| KR | 10-2003-0060055 A | 7/2003 |
| KR | 10-2003-0087914 A | 11/2003 |
| KR | 10-2004-0034398 A | 4/2004 |
| KR | 10-2004-0072961 A | 8/2004 |
| KR | 10-2005-0081836 A | 8/2005 |
| KR | 10-2005-0099472 A | 10/2005 |
| KR | 10-2005-0103127 A | 10/2005 |
| KR | 2005-0103127 | 10/2005 |
| KR | 10-2006-004935 | 1/2006 |
| KR | 10-2006-0014910 A | 2/2006 |
| KR | 10-2006-0029452 A | 4/2006 |
| KR | 10-2006-0090191 A | 8/2006 |
| KR | 10-2007-0076374 | 7/2007 |
| KR | 10-0907978 | 7/2009 |
| KR | 2009-0084756 | 8/2009 |
| RU | 2291594 | 1/2007 |
| RU | 2291594 C2 | 1/2007 |
| RU | 2304348 | 8/2007 |
| TW | 496058 | 7/2002 |
| WO | WO 01/37473 | 5/2001 |
| WO | WO2004/028041 A1 | 4/2004 |
| WO | WO 2004/042953 | 5/2004 |
| WO | WO 2004/042963 A1 | 5/2004 |
| WO | WO2004/102838 | 11/2004 |
| WO | 2005022814 A1 | 3/2005 |
| WO | WO 2005/078967 A1 | 8/2005 |
| WO | WO 2005/079105 | 8/2005 |
| WO | WO2005/109671 | 11/2005 |
| WO | WO 2005/122441 | 12/2005 |
| WO | WO-2005-125226 A2 | 12/2005 |
| WO | WO 2006/009714 | 1/2006 |
| WO | WO 2006/016785 A1 | 2/2006 |
| WO | WO 2006/033521 A1 | 3/2006 |
| WO | WO-2006-046894 A1 | 5/2006 |
| WO | WO 2006/052086 | 5/2006 |
| WO | 2006075820 A1 | 7/2006 |
| WO | WO 2006/083149 | 8/2006 |
| WO | WO 2006/095385 | 9/2006 |
| WO | 2006104773 A1 | 10/2006 |
| WO | WO 2006/104335 A2 | 10/2006 |
| WO | WO 2006/104342 A2 | 10/2006 |
| WO | WO 2006/116620 | 11/2006 |
| WO | WO 2006/118418 | 11/2006 |
| WO | WO 2006/118435 | 11/2006 |
| WO | WO 2007/020070 | 2/2007 |
| WO | WO 2007/023364 | 3/2007 |
| WO | WO 2007/045505 A1 | 4/2007 |
| WO | WO 2007/052921 | 5/2007 |
| WO | WO 2007/052921 A1 | 5/2007 |
| WO | WO 2007/078155 A2 | 7/2007 |
| WO | WO 2007/078156 A2 | 7/2007 |
| WO | WO 2007/078174 | 7/2007 |
| WO | WO 2007/079085 A2 | 7/2007 |
| WO | WO 2007/091831 | 8/2007 |
| WO | WO 2007/147431 | 12/2007 |
| WO | WO 2008/004725 | 1/2008 |
| WO | WO 2008/010063 | 1/2008 |
| WO | WO 2008/094120 | 8/2008 |
| WO | WO 2009/035301 | 3/2009 |

OTHER PUBLICATIONS

3rd Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.

Alcatel-Lucent: "PDCP status report carrying LIS only", 3GPP TSG RAN WG2 #61, Jan. 14-18, 2008, Sevilla, Spain, XP-50138711, R2-080902.

Qualcomm Europe: "Further Details on RACH Procedure", 3GPP TSG-RAN WG1 #48, Feb. 12-16, 2007, St. Louis, Missouri, R1-070649.

NTT DoCoMo, Inc. "Buffer Status Report and Scheduling Request triggers", 3GPP TSG RAN WG2 #59, Aug. 20-24, 2007, Athens, Greece, R2-073574.

"Correction to PDCP Status Report", 3GPP TSG RAN WG2 #61bis, Mar. 24, 2008, R2-081594, XP-002624627.

Ericsson: "Scheduling Request in E-UTRAN", 3GPP TSG-RAN WG2 #47bis, Sorrento, Italy, Jan. 15-19, 2007, R1-070471.

Nokia, "Uplink Scheduling for VoIP", 3GPP TSG-RAN WG2 Meeting #57, Feb. 12-16, 2007, St. Louis, Missouri. R2-070476, XP008125208.

(56) References Cited

OTHER PUBLICATIONS

Nokia, "Buffer Reporting for E-UTRAN", 3GPP TSG-RAN WG2 Meeting #52, Mar. 27-31, 2006, Athens, Greece. R2-060829, XP002503218.
Ericsson, Nokia Corporation, Nokia Siemens Networks, Qualcomm Europe, Samsung, NTT DoCoMo, Inc, "Framework for scheduling request and buffer status reporting", Nov. 5-9, 2007, TSG-RAN WG2 Meeting #60, R2-074691.
Motorola, "Synchronized Random Access Channel and Scheduling Request", Nov. 6-10, 2006, 3GPP TSG RAN1 #47, R1-063046.
Ericsson, "Basic principles for the scheduling request in LTE", Aug. 28-Sep. 1, 2006, 3GPP TSG RAN WG2 #54, R2-062350.
NTT DoCoMo, Fujitsu, Mitsubishi Electric, NEC, Sharp, Toshiba Corporation, "Scheduling Request Transmission Method for E-UTRA Uplink" Nov. 6-10, 2006, 3GPP TSG RAN WG1 Meeting #47, R1-063301.
U.S. Appl. No. 60/976,139 (U.S. Appl. No. 12/238,810, filed Sep. 26, 2008 claims priority to this Provisional).
U.S. Appl. No. 61/019,058 (U.S. Appl. No. 12/340,033, filed Dec. 19, 2008 claims priority to this Provisional).
"Digital Cellular telecommunications system (Phase 2+); Functional stage 2 description of Location Serices (LCS) in GERAN (3GPP TS 43.059 version 7.3.0 Release 7); ETSI TS 143 059" ETSI Standards, LIS, Sophia Antipolis Cedex, France, vol. 3-G1, No. V7.3.0, XP014038519.
ZTE: "Redundant retransmission restraint in RLC-AM", 3GPP Draft; R2-061234, 3rd Generation Partnership Project, Mobile Competence Centre; vol. RAN WG2 No. Shanghai, China, May 3, 2006, XP050131180.
Kashima, Method and Apparatus for Providing Timing Alignment, U.S. Appl. No. 60/944,662 (provisional applications are not published).
Wu et al. Enhanced Random Access Response Formats in E-UTRAN, U.S. Appl. No. 61/006,348 (provisional applications are not published).
Reuven Cohen: "An improved SSCOP-like Scheme for Avoiding Unnecessary Retransmissions and Achieving Ideal Throughput", Proceedings of IEEE Infocom 1996, Conference on Computer Communications, Fifteenth Annual Joint Conference of the IEEE Computer and communications Societies, Mar. 24-28, 1996, pp. 855-862, XP010158150.
LG Electronics Inc: "UE state transition in LTE Active", R2-061002, 3GPP TSG-RAN WG2 #52; Mar. 27-31, 2006, Athens, Greece. XP-050130928.
Texas Instruments: "UL Synchronization Management and Maintenance in E-UTRA", R1-072198, 3GPP TSG-RAN WG1 #49, May 7-11, 2007 Kobe, Japan. XP050105936.
Texas Instruments: "UL Synchronization Management in LTE_Active", R1-071478, 3GPP TSG RAN WG1 #48 bis, Mar. 26-30, 2007, St. Julians, Malta. XP050105413.
Motorola: "Contention-free Intra-LTE Handover", R2-070730, 3GPP TSG-RAN WG2 #57, Feb. 12-16, 2007, St. Louis, Missouri. XP 050133763.
Ericsson: "Scheduling Request in E-Utran", R1-070471, 3GPP TSG-RAN WG2 #47bis, Jan. 15-19, 2007, Sorrento, Italy. XP50104502.
3GPP TS 36.322, V8.0.0, Dec. 2007, $3^{rd}$ Generation Partnership Project; Technical Specification Group Radio Access Network; Evolved Universal Terrestrial Radio Access (E-UTRA) Radio Link Control (RLC) protocol specification (Release 8).
Change Request, Miscellaneous corrections to TS 36.322, 3GPP TSG-RAN2 Meeting #61, Shenzhen, China, Mar. 31-Apr. 4, 2008, R2-081700.
Ericsson: "Clarification to the handling of large RLC status reports", Change Request, 3GPP TSG-RAN2 Meeting #61bis, Shenzhen, China, Mar. 31-Apr. 4, 2008, R2-082018.
LG Electronics et al. "ACK_SN setting for short STATUS PDU", 3GPP TSG-RAN WG2 #62, May 5-9, 2008, Kansas City, Missouri, R2-082133.
Agenda item: 7.4, Source: Qualcomm Europe, Title: Scheduling request mechanism, Document for: Discussion and Decision, 3GPP TSG-RAN WG1 #48bis, Mar. 26-30, 2007, St. Julian, Malta, R1-071276.
Source: Texas Instruments, Title: Scheduling Request and DRX in E-UTRA, Agenda Item: 7.13.2, Document for: Discussion, decision, 3GPP TSG RAN WG1 #49bis, Orlando, USA, Jun. 25-29, 2007, R1-072859.
Change Request, CR-Form-v9.3, 36.300 CR 0004, rev 1, Current version: 8.1.0, 3GPP TSG-RAN2 Meeting #59, Athens, Greece, Jun. 20-24, 2007, R2-073863.
Agenda Item: 5.2.2, Source: Ericsson, Title: SDU Discard, Document for: Discussion, decision, 3GPP TSG-RAN WG2 #59, Athens, Greece, Aug. 20-24, 2007, R2-073230.
Agenda Item: 5.1.1.2, Source: Motorola, Title: MAC Header format, Document for: Discussion/Decision, 3GPP TSG-RAN2 Meeting #59bis, Shanghai, P.R. China, Oct. 8-12, 2007, R2-074419.
Agenda Item: 5.1.1.2, Source: NTT DoCoMo, Inc., NEC, Title: MAC PDU structure for LTE, Document for: Discussion and Decision, 3GPP TSG RAN WG2 #59bis, Oct. 8-12, 2007, Shanghai, China, R2-074174.
3GPP TS 36.321 V1.0.0 (Sep. 2007), Technical Specification, "$3^{rd}$ Generation Partnership Project; Technical Specification Group radio Access Network; Evolved Universal Terrestrial Radio Access (E-UTRA) Medium Access Control (MAC) protocol specification (Release 8)".
Source: Chairman, Date: Oct. 12, Object: LTE User Plane session report, 3GPP TSG RAN WG2 #59bis, Oct. 8-12, 2008, Shanghai, China, R2-074536.
3GPP TS 25.321 V7.5.0 (Jun. 2007), Technical Specification, "$3^{rd}$ Generation Partnership Project; Technical Specification Group Radio Access Network; Medium Access Control (MAC) protocol specification (Release 7)".
LG Electronics Inc., "UE state transition in LTE_ACTIVE", Agenda item: 6.1, Document for: Discussion, Decision, 3GPP TSG-RAN WG2 #52, Mar. 27-31, 2006, Athens, Greece, R2-061002.
Texas Instruments, "UL Synchronization Management and Maintenance in E-UTRA", Agenda Item: 7.8, Document for: Discussion, decision, 3GPP TSG RAN WG1 #49, Kobe, japan, May 7-11, 2007, R1-072198.
Texas Instruments, "UL Synchronization Management in LTE_ACTIVE", Agenda Item: 7.7, Document for: Discussion, decision, 3GPP TSG RAN WG1 #48bis, St. Julians, Malta, Mar. 26-30, 2007, R1-071478.
ITRI, "Buffer Status Reporting with Group Combining for LTE", 3GPP TSG RAN WG2, meeting #58bis, Orlando, Florida, Jun. 25-29, 2007, R2-072833.
NEC, "Consideration on Scheduling Information", 3GPP TSG RAN WG2 #59, Athens, Greece, Aug. 20-24, 2007, R2-073556.
ASUSTeK, "On-line recovery of HFN synchronization due to RLC UM SN problem", 3GPP TSG-RAN WG2 meeting #44, Sophia-Antipolis, France, Oct. 4-8, 2004, R2-041940.
Rapporteur (ASUSTeK), "Summary of HFN de-synchronization problem off-line email discussion", 3GPP TSG RAN WG2 #46, Scottsdale, Arizona, Feb. 14-18, 2005, R2-050318.
Ghosh et al. "Random Access Design for UMTS Air-Interface Evolution", Apr. 2007, IEEE.
"Universal Mobile Telecommunications System (UMTS); Radio Link Control (RLC) protocol specification (3GPP TS 25.322 version 4.10.0 Release 4); ETSI TS 125 322", ETSI Standards, LIS, Sophia Antipolis Cedex, France, vol. 3-R2, No. V4.10.0, Sep. 1, 2003, XP014016803.
LG Electronics Inc: "Correction to Polling Procedure", 3GPP Draft; R2-081588 Correction to Polling Procedure, 3RD Generation Partnership Project (3GPP), Mobile Competence Centre; 650, Route Des Lucioles; F-06921 Sophia-Anti Polis Cedex; France, vol. RAN WG2, No. Shenzhen, China; 20080324, Mar. 24, 2008, XP050139320.
Motorola, "Design of backoff scheme for LTE", 3GPP TSG-RAN-WG2 Meeting #56 bis, Sorrento, Italy, Jan. 15-19, 2007, R2-070143.
Alcatel-Lucent, "Format for RACH Message 2", 3GPP TSG RAN WG2 #60bis, Sevilla, Spain, Jan. 14-18, 2008, R2-080176.

(56) References Cited

OTHER PUBLICATIONS

"MAC Rapporteurs, Change Request: E-UTRA MAC protocol specification update", 3GPP TSG RAN WG2 #60bis, Sevilla, Spain, Jan. 14-18, 2008, R2-080631.
NTT DoCoMo, Inc., "Uplink synchronization maintenance", 3GPP TSG RAN WG2 #58, May 7-11, 2007, Kobe, Japan, R2-072014.
CATT, "Notification scheme for system information change", 3GPP TSG-RAN WG2, #58. May 7-11, 2007, Kobe, Japan, R2-071870.
LG Electronics, "discussion on BCCH Update", 3GPP TSG-RAN WG2, #58is, Jun. 25-29, 2007, Orlando, FL, R2-072736.
Qualcomm Europe, General Corrections to RLC, R2-011701, 3GPP, Jul. 13, 2001.
LG Electronics Inc, Out-of-sequence problem in AM RLC: Discretely discarded SDUs, R2-011206, 3GPP, May 25, 2001.
3rd Generation Partnership Project; Technical Specification Group Radio Access Network; Radio Link Control (RLC) protocol specification (Release 7), Jun. 2007, V7.3.0, 3GPP Organizational Partners, France. XP050367795.
Ericsson, "RLC status report format", TSG-RAN WG2 Meeting #60, Jeju Island, Korea, Nov. 5-9, 2007, R2-074701.
"LTE User Plane Session Report", 3GPP TSG RAN WG2 #59bis, Oct. 8-12, 2008, Shanghai, China, R2-074536.
$3^{rd}$ Generation Partnership Project, "Technical Specification Group Radio Access Network; Medium Access Control (MAC) protocol specification", Release 7, 3GPP TS 25.321, V7.5.0, Jun. 2007.
$3^{rd}$ Generation Partnership Project, "Technical Specification Group Radio Access Network; Evolved Universal Terrestrial Radio Access (E-UTRA) protocol specification", Release 8, 3GPP TS 36.321, V71.0.0, Sep. 2007.
LG Electronics, "Update of eUtran PDCP specification", 3GPP TSG-RAN2, Meeting #61, Sorrento, Italy, 2008, R2-081390.
3rd Generation Partnership Project;Technical Specification Group Radio Access Network;Radio Link Control (RLC) protocol specification(Release 6), 3GPP Draft; 25322-650, 3rd Generation Partnership Project (3GPP), Mobile Competence Centre ; 650, Route Des Lucioles ; F-06921 Sophia-Antipolis Cedex ; France, vol. RAN WG2, No. Cannes, France; Oct. 17, 2005, XP050129441.
Qinqing Zhang et al: "Performance of UMTS radio link control", Proceedings of IEEE International Conference on Communications—Apr. 28-May 2, 2002—New York, NY, USA, IEEE, Piscataway, NJ, USA, vol. 5, Apr. 28, 2002, pp. 3346-3350, XP010590089, DOI: 10.1109/ICC.2002.997451 ISBN: 978-0-7803-7400-3.
Romain Masson: "E-UTRA RACH within the LTE system", Thesis Submitted in Fulfillment of the Requirements for the Award of the Degree Master of Engineering Research From the University of Lausanne, School of Electrical, Computer and Telecommunications Engineering, CH, Feb. 3, 2006, pp. 1-82, XP002448009.
LG Electronics Inc: "R2-073043 RACH procedure", 3GPP TSG-RAN WG2 #59, Athens, Greece, No. R2-073043 Aug. 19, 2007, pp. 1-3, XP002515770, Retrieved from the Internet: URL:http://www.3gpp.org/ftp/tsg_ran/WG2_RL2/TSGR2_59/Docs/ [retrieved on Aug. 15, 2007].
3GPP Draft; R2-080189 LTE_RA_BO_RO, 3RD Generation Partnership Project (3GPP), Mobile Competence Centre ; 650, Route Des Lucioles ; F-06921 Sophia-Antipolis Cedex ; France, vol. Ran WG2, No. Sevilla, Spain; Jan. 7, 2008, XP050138064, [retrieved on Jan. 7, 2008].
"$3^{rd}$ Generation Partnership Project; Technical Specification Group Radio Access Network; Evolved Universal Terrestrial Radio Access (E-UTRA) Medium Access Control (MAC) Protocol Specification (Release 8)", EGPP TS 36.321 V8.0.0, vol. 36.321, No. V8.0.0, Dec. 1, 2007, pp. 1-23, XP002520880, Retrieved from the Internet: URL:http://www.quintillion.co.ip/3GPP/Specs/36321-800.pdf [retrieved on Mar. 24, 2009] *paragraph [0006]—paragraph [0006]*.
$3^{rd}$ Generation Partnership Project; Technical Specification Group Radio Access Network; Evolved Universal Terrestrial Radio Access (E-UTRA) Medium Access Control (MAC) protocol specification (Release 8); 3GPP TS 36.321 v8.2.0 (May 2008).
R2-095152, 3GPP TSG-RAN WG2 Meeting #67, "Minor Correctons to 36.321", Shenzhen, China, Aug. 24-28, 2009.
3GPP TS 36.322 V8.0.0, 3rd Generation Partnership Project; Technical Specification Group Radio Access Network; Evolved Universal Terrestrial Radio Access (E-UTRA) Radio Link Control (RLC) protocol Specification, (Dec. 20, 2007).
QUALCOMM Europe, L2 Improvements And Polling, 3GPP TSG-RAN WG2 Meeting #58 R2-072021, May 11, 2007, pl-p3, URL, http://www.3gpp.org/ftp/tsg_ran/WG2_RL2/TSGR2_58/Documents/R2-072021.zip.
LG Electronics Cannes, France, Jun. 27-30, 2006, Delivery of LTE System Information, 3GPP TSG-RAN WG2 ad-hoc on LTE, R2-061959.

\* cited by examiner

METHOD FOR CONTROLLING HARQ OPERATION IN DYNAMIC RADIO RESOURCE ALLOCATION

This application is a National Stage Entry of International Application No. PCT/KR2008/004641, filed on Aug. 8, 2008, and claims priority to U.S. Provisional Application Ser. Nos. 60/955,040, filed Aug. 10, 2007; 60/982,145, filed Oct. 24, 2007; 60/982,710, filed Oct. 25, 2007; and 60/983,304, filed Oct. 29, 2007; and Korean Patent Application No. 10-2008-0077778, filed Aug. 8, 2008, each of which is hereby incorporated by reference in its entirety as if fully set forth herein.

TECHNICAL FIELD

The present invention relates to a wireless communication system providing wireless communication services and a terminal, and more particularly, to a method for communicating data between a base station and a terminal in Evolved Universal Mobile Telecommunications System (E-UMTS) or Long Term Evolution (LTE) System evolved from UMTS, particularly, a method for transferring maximum data with minimum radio resources by controlling a Hybrid Automatic Repeat request (HARQ) operation in a dynamic radio resource allocation or scheduling.

BACKGROUND ART

Figure 1:
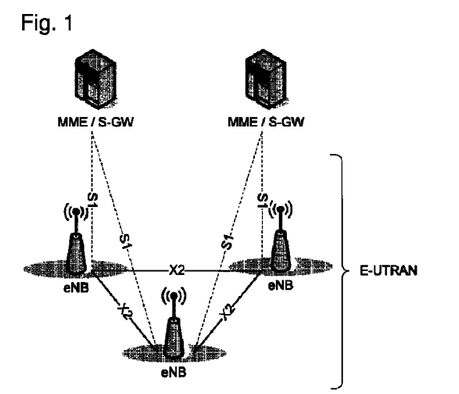
FIG. 1 is a network architecture of E-UTRAN which is a mobile communication system to which the related art and the present invention are applied.

FIG. 1 shows a network architecture of E-UMTS as a mobile communication system to which the related art and the present invention are applied. The E-UMTS system has evolved from the existent UMTS system and a basic standardization therefor is undergoing in 3GPP. Such E-UMTS system may also be referred to as a Long Term Evolution (LTE) system.

E-UMTS network may be divided into E-UTRAN and Core Network (CN). The E-UTRAN includes a terminal (User Equipment, referred to as 'UE' hereinafter), a base station (referred to as 'eNode B' hereinafter), a Serving Gateway (S-GW) located at the end of the network to be connected to an external network, and a Mobility Management Entity (MME) for managing the mobility of the UE. One or more cells may exist in one eNode B.

Figure 2:
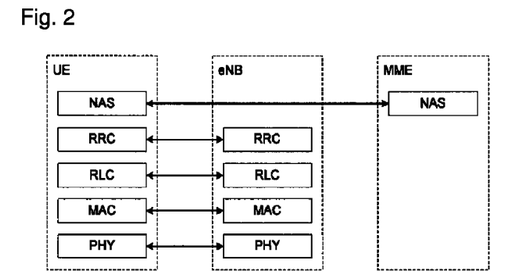
FIG. 2 is an exemplary view showing an architecture of radio interface protocols between a terminal and E-UTRAN in a control plane according to the related art.

FIG. 2 shows a radio interface protocol architecture between UE and base station based on the 3GPP radio access network standard. The radio interface protocol in FIGS. 2 and 3 has horizontal layers comprising a physical layer, a data link layer and a network layer, and has vertical planes comprising a user plane for transmitting data information and a control plane for transmitting a control signaling. The protocol layers in FIGS. 2 and 3 can be divided into a first layer (L1), a second layer (L2) and a third layer (L3) based on three lower layers of an Open System Interconnection (OSI) standard model widely known in communications systems.

Figure 3:
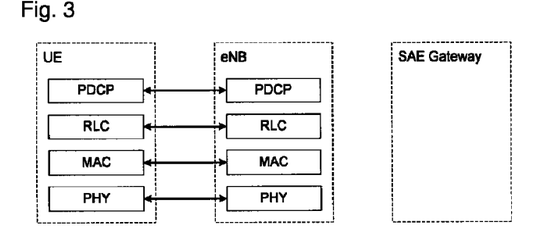
FIG. 3 is an exemplary view showing an architecture of radio interface protocols between a terminal and E-UTRAN in a user plane according to the related art.

Hereinafter, each layer in the radio protocol control plane in FIG. 2 and a radio protocol user plane in FIG. 3 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side.

The MAC layer located at the second layer provides a service to an upper layer, called a Radio Link Control (RLC) layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer, in the radio protocol user plane, is used to efficiently transmit IP packets, such as IPv4 or IPv6, on a radio interface with a relatively small bandwidth. For this purpose, the PDCP layer reduces the size of an IP packet header which is relatively great in size and includes unnecessary control information, namely, a function called header compression is performed.

A Radio Resource Control (RRC) layer located at the uppermost portion of the third layer is only defined in the control plane. The RRC layer controls logical channels, transport channels and physical channels in relation to configuration, re-configuration and release of Radio Bearers (RBs). Here, the RB signifies a service provided by the second layer for data transmissions between the terminal and the UTRAN.

Figure 4:
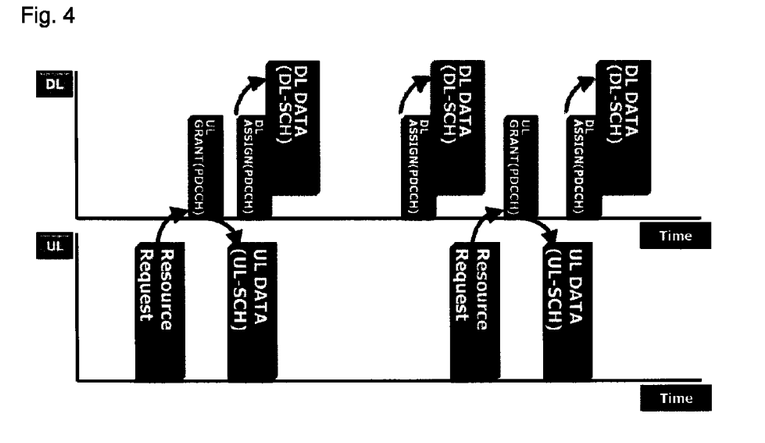
FIG. 4 is an exemplary view showing a dynamic radio resource allocating operation.

In general, a dynamic radio resource scheduling is a method for informing radio resources to be used every time of a transmission or reception of UE. FIG. 4 is an exemplary view showing the operations of the dynamic radio resource allocation. Typically, an uplink radio resource allocation (e.g., UL GRANT) message or downlink radio resource allocation (e.g., DL ASSIGNMENT) message is transmitted via a Physical Downlink Control Channel (PDCCH). Accordingly, a UE receives or monitors the PDCCH at every designated time. Upon receiving a UE identifier (e.g., C-RNTI) allocated, then the UE receives or transmits radio resources indicated in the UL GRAT or DL ASSIGNMENT transmitted via the PDCCH, and then uses the radio resources to enable data transmission/reception between the UE and eNode B.

Figure 5:
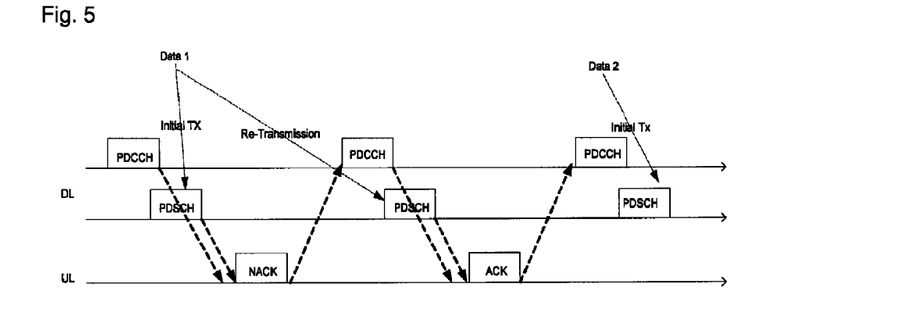
FIG. 5 is an exemplary view showing a Hybrid Automatic Repeat Request (HARQ) operation.

FIG. 5 is an exemplary view showing a detailed embodiment of HARQ applied to a downlink physical layer of a radio packet communication system. As shown in FIG. 5, eNode B decides a UE to receive a packet and a format of packet (coding rate, modulation method, data amount, and the like) to be transmitted to the UE. The eNode B then informs the UE of such information via the PDCCH, and thereafter transmits the corresponding data packet through a Physical Downlink Shared Channel (PDSCH) at an associated time. Thus, the UE can receive the information transmitted via the PDCCH so as to be known of the format of the packet to be transmitted to it and the packet transmission time, and also receive the corresponding packet via the PDSCH. After receiving the packet, the UE decodes the packet data. In case of a successful decoding, the UE transmits an ACK signal to the eNode B. The eNode B receiving the ACK signal may sense that the packet has successfully been received, thus to perform the next packet transmission. In case of an unsuccessful decoding, the UE transmits a NACK signal to the eNode B. The eNode B receiving the NACK signal may sense that the packet has unsuccessfully been received by the UE and accordingly retransmits the same data packet in the same format or a new format at an appropriate time. Here, the UE may combine the retransmitted packet with a packet which was received but failed to be decoded in various ways so as to attempt the decoding again.

As mentioned above, between the UE and the eNode B, a transmitting side performs the retransmission until it receives a HARQ ACK from a receiving side. However, in case where the transmitting side continuously receives a HARQ NACK from the receiving side, if the transmitting side keeps performing the retransmission, a delay of data transmission may occur. For example, referring to FIG. 5, if the transmitting side continuously receives NACK for Data 1 from the receiving side and thereby keeps performing the retransmission, the next Data 2 may not start to be transmitted. That is, the transmission of Data 2 is delayed. Accordingly, in general, when the HARQ operation is performed, the transmitting side should perform the transmission by setting how many times the retransmission should be performed for which data, namely, the maximum number of retransmissions. That is, the transmitting side would not perform the retransmission more than the maximum number of retransmissions.

However, a value such as transmission delay requirement depends on services. For example, a delay should be minimized for a voice call. Also, a delay may not be a problem for an Internet service. Therefore, the maximum number of retransmissions should differently be designated for each service.

DISCLOSURE OF INVENTION

Technical Solution

Therefore, it is an object of the present invention to minimize an amount of radio resources to be used and simultaneously meet a Quality of Service (QoS) of each service by providing an efficient radio resource allocation, in using a dynamic radio resource allocation.

To achieve these objects, there is provided a method for communicating data in a wireless communication system, comprising: receiving a radio resource allocation message from a network, the message including information related to a Hybrid Automatic Repeat request (HARQ) process; and transmitting one or more data blocks according to the received radio resource allocation message.

To achieve these objects, there is also provided a mobile terminal for communicating data in a wireless communications system, the mobile terminal comprising: a transceiver adapted to transmit or receive the data; a memory adapted to store the data transmitted or received via the transceiver or from an external source; and a processor cooperating with the transceiver and the memory and adapted to perform the steps of, receiving a radio resource allocation message from a network, wherein the radio resource allocation message includes information related to a HARQ (Hybrid Automatic Repeat request) process; and transmitting one or more data blocks according to the received radio resource allocation message.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, configuration and operation of the preferred embodiments of the present invention will be described with reference to the accompanying drawings.

Figure 6:
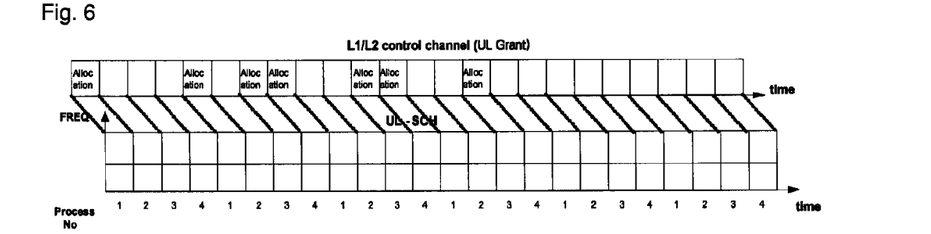
FIG. 6 is an exemplary view showing an adaptive HARQ operation.
Figure 7:
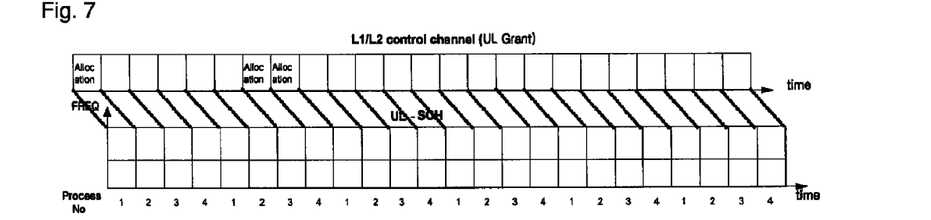
FIG. 7 is an exemplary view showing a non-adaptive HARQ operation.

First, in order to allocate radio resources, a transmission of radio resource allocation message is needed. FIG. 6 shows an adaptive HARQ operation. As shown in FIG. 6, the adaptive HARQ is configured such that a transmitting side performs a retransmission only when receiving a radio resource allocation message. FIG. 7 shows a non-adaptive HARQ operation. As shown in FIG. 7, the non-adaptive HARQ is configured such that when receiving a radio resource allocation message indicating an initial transmission of new data, a transmitting side can use a radio resource indicated in the message as it is at a time when a retransmission is required to be performed. That is, the non-adaptive HARQ allows the transmitting side to perform the retransmission even without receiving the radio resource allocation message at the time when the retransmission is required to be performed.

Figure 8:
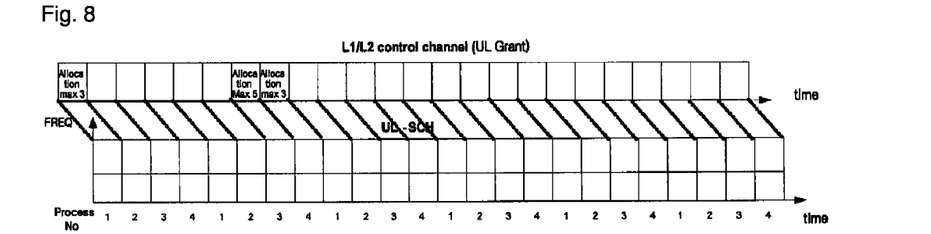
FIG. 8 shows a first embodiment of a radio resource allocation in accordance with the present invention.

FIG. 8 is a first embodiment of a radio resource allocation in accordance with the present invention. As shown in FIG. 8, when an uplink radio resource is allocated via a L1/L2 control channel (i.e., Physical Downlink Control Channel (PDCCH)), a radio resource allocation message indicates a maximum number of retransmission to a UE. For example, in FIG. 8, the first radio resource allocation message indicates that the maximum number of retransmission is 3, and the second radio resource allocation message indicates that the maximum number of retransmission is 5. Therefore, the UE can retransmit first data maximum 3 times, and second data maximum 5 times. That is, when the UE receives the information related to the maximum number of retransmission through the radio resource allocation message, the retransmission is not performed more than the number of times indicated. That is, in case of a certain radio resource being allocated, if the UE exceeds the maximum number of retransmission for data which is being transmitted, the radio resource is released and used no more.

Figure 9:
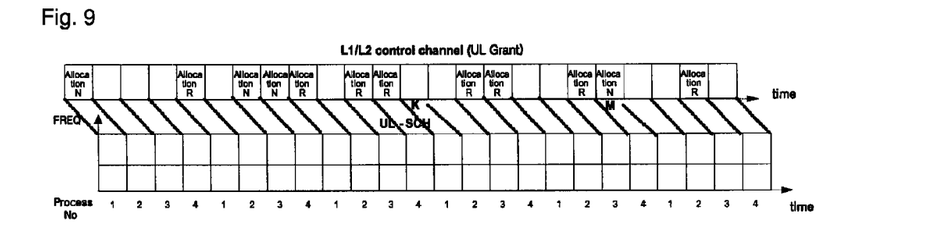
FIG. 9 shows a second embodiment of a radio resource allocation in accordance with the present invention.

Also, in order to dynamically control the maximum number of retransmission, the UE may be allowed to perform the retransmission until a certain event is generated. That is, upon transmitting a certain data block, the UE can continue to retransmit the data being transmitted, if the UE has not been allocated a radio resource required for the retransmission of the data block or until it receives an indication as to an initial transmission of new data. In other words, if the UE has not been allocated a radio resource required for the retransmission of a data block or receives the indication as to the initial transmission of new data, it is assumed that the UE has reached the limit of maximum number of retransmission. FIG. 9 is a second embodiment of a radio resource allocation in accordance with the present invention. In FIG. 9, "Allocation N" denotes an initial transmission of new data, and "Allocation R" denotes a retransmission of certain data. As shown in FIG. 9, an initial radio resource allocation message is a message for indicating a transmission of new data. Thus, the UE configures a new data block to start its transmission. Afterwards, since the UE has received a radio resource allocation message indicating a retransmission at next retransmission timing, it performs the retransmission. However, in FIG. 9, the UE has not received any radio resource allocation message at a time specified by K. Accordingly, the UE does not perform the retransmission any more for Process 1 related to the timing, namely, it considers as it has reached the limit of the maximum number of retransmission. Also, the UE has received a radio resource allocation message indicating an initial transmission of new data at a time specified by M. Accordingly, even if there is any data having unsuccessfully transmitted in the related process, the UE does not perform the retransmission any more and considers it as having reached the limit of the maximum number of retransmission. The UE then performs the transmission of the new data according to the indication of the radio resource allocation message.

Figure 10:
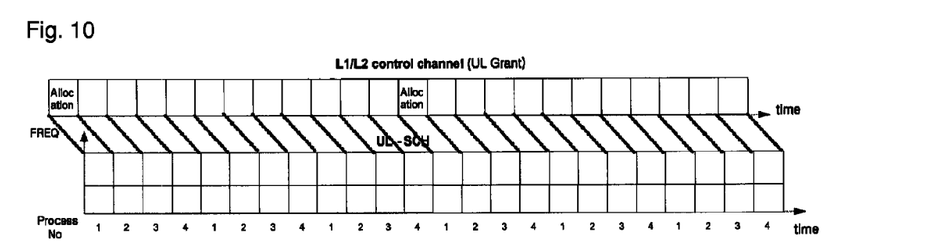
FIG. 10 shows a third embodiment of a radio resource allocation in accordance with the present invention.

The present invention aims to reduce the number of transmission of the radio resource allocation message. To this end, the present invention proposes an allocation of plural processes to one radio resource allocation message. FIG. 10 is a third embodiment for a radio resource allocation according to the present invention. As shown in FIG. 10, one radio resource allocation message is applied to every process (e.g., processes 1 to 4) set for a UE. Thus, upon receiving the radio resource allocation message, the UE operates with considering as being able to use a radio resource indicated in the radio resource allocation message at every process set therefor.

Figure 11:
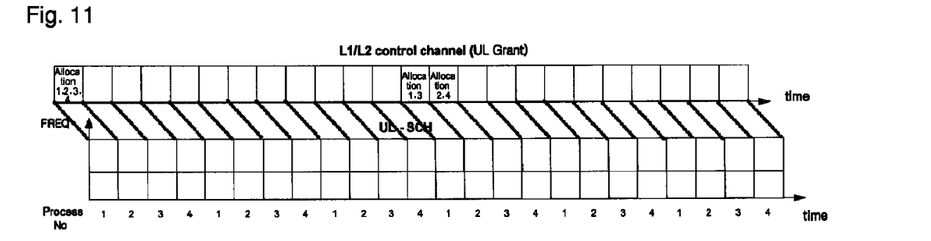
FIG. 11 shows a fourth embodiment of a radio resource allocation in accordance with the present invention.

As another method, process information may be included in the radio resource allocation message to thusly allow a radio resource to be selectively allocated. That is, one radio resource allocation message may include information related to specific process to which such message should be applied. Accordingly, after receiving the radio resource allocation message, if the radio resource allocation message includes related process information, the UE regards it as being able to use a radio resource indicated in the radio resource allocation message at processes informed by the process information. For example, as shown in FIG. 11, the first radio resource allocation message indicates that the radio resource allocation message is applied to processes 1, 2, 3 and 4. Hence, the UE uses a radio resource indicated in the radio resource allocation message at the processes 1, 2, 3 and 4. In addition, as shown in FIG. 11, the second radio resource allocation message indicates that the radio resource allocation message is applied to processes 1 and 3. Accordingly, the UE uses a radio resource indicated in the radio resource allocation message at the processes 1 and 3.

Figure 12:
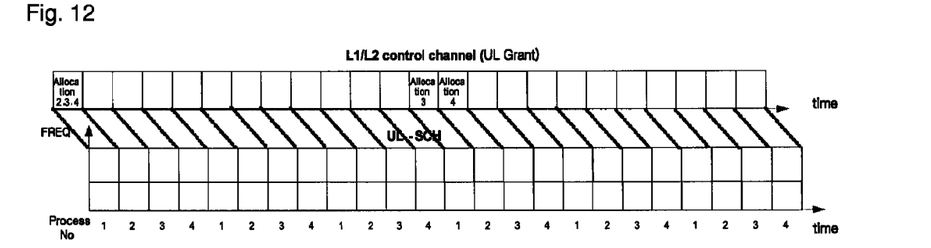
FIG. 12 shows a fifth embodiment of a radio resource allocation in accordance with the present invention.

Still referring to FIG. 11, the use of a reception timing of the radio resource allocation message allows part of process ID to be omitted. For example, in FIG. 11, since the first radio resource allocation message is transmitted at a timing corresponding to the process 1, the radio resource allocation message can be considered as being applied to the process 1. Therefore, employing such manner, as shown in FIG. 12, part of process ID can be omitted from the radio resource allocation message. That is, radio resources actually allocated to the UE in FIG. 11 is the same as radio resources allocated to the UE in FIG. 12 in their amount and characteristic (or property).

Figure 13:
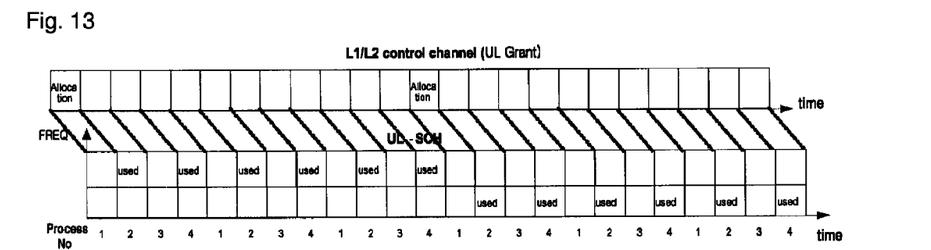
FIG. 13 shows a sixth embodiment of a radio resource allocation in accordance with the present invention.

Also, the present invention may enable a process allocation pattern to be previously set. For example, at the beginning of a call setup, upon receiving a radio resource allocation message, eNode B and UE may preset information related to a process, to which the radio resource allocation message is applied, and a process allocation pattern. For example, upon the call setup, if the radio resource allocation message is set to be used at processes 2 and 4, an operation shown in FIG. 13 may be performed. That is, even if the firstly received radio resource allocation message does not include process related information, the UE uses a radio resource indicated by the radio resource allocation message at the processes 2 and 4. Also, during the procedure, a plurality of process allocation patterns are set at the beginning of the call, and an identity of a process allocation pattern to be actually used may be informed through the radio resource allocation message.

Figure 14:
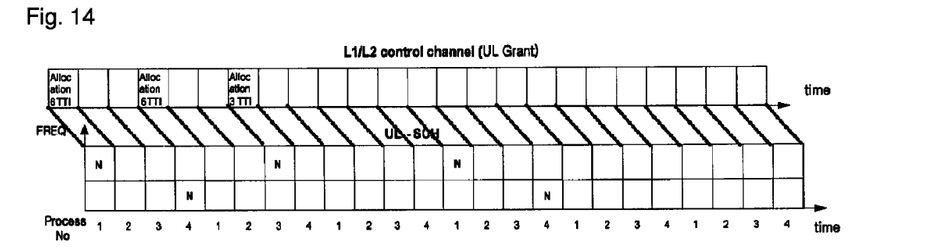
FIG. 14 shows a seventh embodiment of a radio resource allocation in accordance with the present invention.

The present invention proposes to apply one radio resource allocation message to a plurality of time intervals. Accordingly, the number of transmission of the radio resource allocation message can be reduced. That is, the radio resource allocation message indicates during which time intervals the radio resource allocation message is applied. Therefore, if the radio resource allocation message includes time interval information, the UE having received the radio resource allocation message uses radio resources indicated in the radio resource allocation message during the time intervals informed by the time interval information. For example, as shown in FIG. 14, the first radio resource allocation message indicates that it is applied during six Transmission Time Intervals (TTIs). Accordingly, the UE uses the radio resources indicated in the radio resource allocation message during the six TTIs. Here, the TTI may be set for each process. In other words, in FIG. 14, since the first radio resource allocation message is received at the first process, the radio resources indicated in the radio resource allocation message is used during the six TTIs during which the first process is activated.

Figure 15:
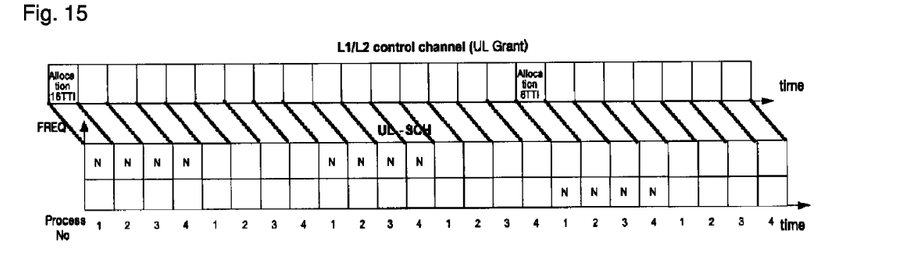
FIG. 15 shows an eighth embodiment of a radio resource allocation in accordance with the present invention.

Unlike to this, FIG. 15 illustrates that consecutive TTIs are used without considering processes. That is, as shown in FIG. 15, the first radio resource allocation message indicates that the message is applied during 16 TTIs. Thus, the UE uses radio resources indicated in the radio resource allocation message during the 16 consecutive TTIs. In addition, instead of the TTIs, the number of transmission-allowed Medium Access Control Protocol Data Units (MAC PDUs) may be informed. For example, the radio resource allocation message may include an indication that 3 MAC PDUs are available to be transmitted.

Here, a measurement gap related to the present invention will not be described. A UE can receive a specific frequency or a specific radio access technology at a specific time. Thus, in order that the UE which is receiving one frequency of a specific radio access technology could receive another frequency or another radio access technology, the UE should move out of the frequency of the current radio access technology which it is receiving. However, when the UE is communicating data with an eNode B at the current frequency, if the UE randomly changes such frequency, a data access error may occur. In order to prevent this, a measurement gap may be set between the eNode B and the UE. Accordingly, at a time indicated by the measurement gap, the UE transits into a frequency of a radio access technology which it desires to measure. When the indicated time is over, the UE returns to its frequency at which it originally communicates data.

Here, the present invention proposes that a UE intended to perform a measurement process can efficiently perform a HARQ operation.

To this end, the present invention proposes that when a UE enters a handover, if a timing for performing HARQ retransmission is equal to the measurement gap, the UE may use the measurement gap for measuring a cell of another radio access technology or a cell of another frequency. That is, when the measurement gap is overlapped with the HARQ retransmission, the UE is needed to stop the HARQ retransmission for the overlapped time. If valid radio resources are left after the completion of the measurement gap, the UE is needed to perform the HARQ retransmission.

Also, the present invention proposes that when a UE is not in handover, if a timing for performing the HARQ retransmission is equal to the measurement gap, the UE may measure a cell of another radio access technology or a cell of another frequency. That is, even if the measurement gap is overlapped with the HARQ retransmission, the UE is needed to perform the HARQ retransmission. If valid radio resources are left after the completion of the measurement gap, the UE is needed to perform the HARQ retransmission.

The present invention also proposes that when a UE is not in handover, if a timing for receiving HARQ ACK/NACK from an eNode B is equal to the measurement gap, the UE may not measure a cell of another radio access technology or a cell of another frequency. That is, if the measurement gap is overlapped with the reception time of the HARQ ACK/NACK, the UE may neither stop the HARQ operation nor use the measurement gap.

The present invention also proposes that when a UE transmits an RRC message, if a timing for performing the HARQ retransmission of MAC PDU including the RRC message is equal to the measurement gap, the UE may not measure a cell of another radio access technology or a cell of another frequency. That is, even if the measurement gap is overlapped with the HARQ retransmission of the MAC PDU including the RRC message, the UE is needed to perform the HARQ retransmission. When valid radio resources are left after the completion of the measurement gap, the UE is needed to perform the HARQ retransmission.

The present invention proposes that when a UE transmits MAC PDU including RRC message, if a timing for receiving HARQ ACK/NACK of the MAC PDU from an eNode B, the UE may not measure a cell of another radio access technology or a cell of another frequency. That is, when the measurement gap is overlapped with the reception timing of the HARQ ACK/NACK, the UE may not use the measurement gap.

The present invention proposes that when transmitting a RRC measurement report message, if a timing for performing a HARQ retransmission of MAC PDU including the RRC measurement report message is equal to the measurement gap, the UE may not measure a cell of another radio access technology or a cell of another frequency. That is, even if the measurement gap is overlapped with the HARQ retransmission of the MAC PDU including the RRC measurement report message, the UE may perform the HARQ retransmission. When valid radio resources are left after the completion of the measurement gap, the UE may perform the HARQ retransmission.

The present invention proposes that when transmitting a MAC PDU including a RRC measurement report message, if a timing for receiving HARQ ACK/NACK of the MAC PDU from an eNode B is equal to the measurement gap, the UE may not measure a cell of another radio access technology or a cell of anther frequency. That is, when the measurement gap is overlapped with the reception timing of the HARQ ACK/NACK, the UE may neither stop the HARQ operation nor use the measurement gap.

The present invention proposes that when a UE is in a handover area, if a discontinuous reception (DRX) timing is equal to a timing of the measurement gap, the UE may use the measurement gap. When the UE is not in the handover area and the DRX timing is equal to the timing of the measurement gap, the UE may not use the measurement gap.

The present invention proposes that when a UE is in a handover area and there is a HARQ retransmission to receive downwardly, if a DRX timing is equal to a timing of a measurement gap, the UE may use the measurement gap. When the UE is not in the handover area and there is a HARQ retransmission to receive downwardly, if the DRX timing is equal to the timing of the measurement gap, the UE may not use the measurement gap.

Here, the present invention may be applied based upon whether a UE is in a handover area. However, other criteria may be considered. That is, examples of those criteria may include ① whether a cell in which a UE is staying or a cell which the UE is receiving has quality more than or less than a certain level, ② whether the UE has received MAC or RRC command to perform a certain action, ③ whether there is a RRC message to be transmitted, ④ whether there is a RRC process in progress, ⑤ whether there is a measurement report to be transmitted, ⑥ whether a length of DRX level or interval is more than or less than a certain reference value, ⑦ whether quality of neighboring cell is more than or less than a certain reference, ⑧ whether a certain time elapsed after a transmission time of a lastly-transmitted measurement report, ⑨ whether a certain time elapsed after a time of a lastly-performed measurement, and ⑩ whether a certain time elapsed after a time of a lastly-used measurement gap.

For example, when UL HARQ related data transmission timing is overlapped with the measurement gap, the UE determines whether to use the measurement gap, according to whether the above criteria are met. However, if the measurement gap is not equal to the HARQ, the UE always performs the measurement.

In addition, when DL HARQ related data reception timing is overlapped with the measurement gap, the UE determines whether to use the measurement gap, according to whether the above criteria are met. However, if the measurement gap is not overlapped with the HARQ, the UE always performs the measurement.

When an expected DL HARQ related data reception timing is overlapped with the measurement gap, the UE determines whether to use the measurement gap according to whether the above criteria are met. However, if the measurement gap is not overlapped with the HARQ, the UE always performs the measurement.

When HARQ related ACK/NACK reception timing is overlapped with the measurement gap, the UE determines whether to use the measurement gap according to whether the above criteria are met. However, if the measurement gap is not overlapped with the HARQ, the UE always performs the measurement.

When HARQ related ACK/NACK transmission timing is equal to the measurement gap, the UE determines whether to use the measurement gap according to whether the above criteria are met. However, if the measurement gap is not overlapped with the HARQ, the UE always performs the measurement.

During the procedure, when the UE transmits the HARQ NACK, it may be defined that DL HARQ related data reception is expected. Also, during the procedure, when a certain time elapses after the transmission of the HARQ NACK, it may be defined that DL HARQ related data reception is expected. In addition, during the procedure, when a certain time does not elapse after the transmission of the HARQ NACK, it may be defined that DL HARQ related data reception is expected.

Also, the measurement gap may partially be used. For example, assuming that the measurement gap is 10 ms, if the measurement gap is overlapped with the NARQ operation by just 1 ms, the UE does use the measurement gap for the remaining time intervals except for the 1 ms thereof.

In addition, the HARQ operation may forcibly be performed. That is, when UL HARQ related data transmission timing is overlapped with the measurement gap, the UE may not use the measurement gap at any time. That is, the UE does not perform the measurement for the time interval. Also, when the DL HARQ related data reception timing is overlapped with the measurement gap, the UE may not use the measurement gap at any time. That is, the UE does not perform the measurement for the time interval. Furthermore, when an expected DL HARQ related data reception timing is overlapped with the measurement gap, the UE may not use the measurement gap at any time. That is, the UE does not perform the measurement for the time interval. Also, when the HARQ related ACK/NACK reception timing is overlapped with the measurement gap, the UE may not use the measurement gap at any time. That is, the UE does not perform the measurement for the time interval.

Therefore, the present invention allows an increase in an efficiency of radio resources by dynamically adjusting the maximum number of retransmission, efficiently combining radio resource allocation information, or adjusting HARQ operation during a measurement process.

The present disclosure may provide a method of communicating data in a wireless communication system, the method comprising: receiving a radio resource allocation message from a network, wherein the radio resource allocation message includes information related to a HARQ (Hybrid Automatic Repeat request) process; and transmitting one or more data blocks according to the received radio resource allocation message, wherein the radio resource allocation message is received on Physical Downlink Control Channel (PDCCH), the radio resource allocation message includes a plurality of HARQ process identifier information, the one or more data blocks are transmitted at each time indicated by the plurality of HARQ process identifier information, a pattern of the information related to HARQ process is predetermined during a call setup between a terminal and the network, the radio resource allocation message includes information related to a Transmission Time Interval (TTI), the radio resource allocation message includes a maximum number of retransmission in the HARQ process.

It can be also said that the present disclosure may provide a mobile terminal for communicating data in a wireless communications system, the mobile terminal comprising: a transceiver adapted to transmit or receive the data; a memory adapted to store the data transmitted or received via the transceiver or from an external source; and a processor cooperating with the transceiver and the memory and adapted to perform the steps of, receiving a radio resource allocation message from a network, wherein the radio resource allocation message includes information related to a HARQ (Hybrid Automatic Repeat request) process; and transmitting one or more data blocks according to the received radio resource allocation message.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of communicating data in a wireless communication system, the method comprising:

setting up a call between a terminal and a network, wherein a process allocation pattern of at least one HARQ (Hybrid Automatic Repeat request) process is predetermined during the call setup, wherein the process allocation pattern includes a plurality of different processes operated by the terminal, and wherein the predetermined process allocation pattern is identified by a pattern identifier;

receiving a radio resource allocation message from the network, wherein the radio resource allocation message includes the pattern identifier; and transmitting one or more data blocks according to the received radio resource allocation message, wherein the pattern identifier informs the terminal of the predetermined allocation pattern to be used by the terminal when transmitting, wherein a reception timing of the radio resource allocation message is used so as to omit HARQ process identifier information from the radio resource allocation message, wherein the radio resource allocation message further includes process information indicating a specific process that uses the predetermined allocation pattern, wherein the process information is used to perform the specific process among the plurality of different processes included in the process allocation pattern, wherein the radio resource allocation message further includes time interval information, wherein the one or more data blocks are transmitted to the network using the predetermined allocation pattern during a specific time interval informed by the time interval information, wherein the specific time interval is represented by a unit of transmission time intervals (TTIs), and wherein the time interval information is set differently for each process included in the process information.

2. The method of claim 1, wherein the radio resource allocation message is received on Physical Downlink Control Channel (PDCCH).

3. The method of claim 1, wherein the radio resource allocation message includes a maximum number of retransmission in the HARQ process.

4. A mobile terminal for communicating data in a wireless communications system, the mobile terminal comprising:
 a transceiver adapted to transmit or receive the data;
 a memory adapted to store the data transmitted or received via the transceiver or from an external source; and
 a processor cooperating with the transceiver and the memory and configured to perform the steps of:

setting up a call between a terminal and a network, wherein a process allocation pattern of at least one HARQ (Hybrid Automatic Repeat request) process is predetermined during the call setup, wherein the process allocation pattern includes a plurality of different processes operated by the mobile terminal, and wherein the predetermined process allocation pattern is identified by a pattern identifier;

receiving a radio resource allocation message from the network, wherein the radio resource allocation message includes the pattern identifier; and transmitting one or more data blocks according to the received radio resource allocation message, wherein the pattern identifier informs the terminal of the predetermined allocation pattern to be used by the terminal when transmitting, wherein a reception timing of the radio resource allocation message is used so as to omit HARQ process identifier information from the radio resource allocation message, wherein the radio resource allocation message further includes process information indicating a specific process that uses the predetermined allocation pattern, wherein the process information is used to perform the specific process among the plurality of different processes included in the process allocation pattern, wherein the radio resource allocation message further includes time interval information, wherein the one or more data blocks are transmitted to the network using the predetermined allocation pattern during a specific time interval informed by the time interval information, wherein the specific time interval is represented by a unit of transmission time intervals (TTIs), and wherein the time interval information is set differently for each process included in the process information.

\* \* \* \* \*